(12) United States Patent
Williams (10) Patent No.: US 7,451,472 B2
(45) Date of Patent: Nov. 11, 2008

(54) SYSTEM AND METHOD TO TEST NETWORK PERFORMANCE WITH IMPAIRMENTS

(75) Inventor: Thomas H. Williams, Longmont, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 1288 days.

(21) Appl. No.: 10/262,234

(22) Filed: Sep. 30, 2002

(65) Prior Publication Data

US 2004/0073937 A1    Apr. 15, 2004

(51) Int. Cl.
| H04N 7/173 | (2006.01) |
| H04N 17/00 | (2006.01) |
| H04N 17/02 | (2006.01) |

(52) U.S. Cl. .................. 725/107; 725/127; 725/121; 348/192

(58) Field of Classification Search .............. 725/127, 725/107, 121, 124, 125

See application file for complete search history.

(56) References Cited

U.S. PATENT DOCUMENTS

| 3,750,022 | A | * | 7/1973 | Curry et al. ............... 725/125 |
| 5,943,604 | A | * | 8/1999 | Chen et al. ................ 455/3.06 |
| 6,049,693 | A | * | 4/2000 | Baran et al. ............... 725/124 |
| 6,542,500 | B1 | * | 4/2003 | Gerszberg et al. .......... 370/354 |
| 6,546,016 | B1 | * | 4/2003 | Gerszberg et al. .......... 370/401 |
| 6,567,132 | B1 | * | 5/2003 | Groff et al. ................ 348/723 |
| 6,567,579 | B2 | * | 5/2003 | Foltzer ..................... 385/24 |
| 6,571,393 | B1 | * | 5/2003 | Ko et al. ................... 725/121 |
| 6,687,261 | B1 | * | 2/2004 | Skeba et al. ............... 370/468 |
| 6,714,534 | B1 | * | 3/2004 | Gerszberg et al. .......... 370/352 |
| 6,785,292 | B1 | * | 8/2004 | Vogel ....................... 370/433 |
| 6,850,533 | B2 | * | 2/2005 | Gerszberg et al. .......... 370/401 |
| 7,010,730 | B1 | * | 3/2006 | Jaworski et al. ............ 714/704 |
| 7,024,680 | B2 | * | 4/2006 | Howard ..................... 725/107 |
| 7,162,731 | B2 | * | 1/2007 | Reidhead et al. ........... 725/107 |
| 7,246,368 | B1 | * | 7/2007 | Millet et al. ............... 725/111 |
| 2002/0076143 | A1 | * | 6/2002 | Foltzer ..................... 385/24 |
| 2003/0185176 | A1 | * | 10/2003 | Lusky et al. ............... 370/335 |
| 2004/0103442 | A1 | * | 5/2004 | Eng ......................... 725/126 |
| 2004/0245995 | A1 | * | 12/2004 | Williams ................... 324/512 |
| 2005/0123002 | A1 | * | 6/2005 | Skeba et al. ............... 370/493 |
| 2006/0048200 | A1 | * | 3/2006 | Jaworski et al. ............ 725/107 |
| 2006/0141971 | A1 | * | 6/2006 | Howard ..................... 455/296 |

OTHER PUBLICATIONS

Prodan, Richard; Chelehmal, Majid; Williams, Tom; "Results of return plant testing," NCTA Technical Papers, 1997, pp. 146-168.

* cited by examiner

Primary Examiner—Christopher Grant
Assistant Examiner—Amit K Ray
(74) Attorney, Agent, or Firm—William W. Cochran; Cochran Freund & Young LLC (57) ABSTRACT

The upstream performance characteristics of a network are measured by looping a signal through both the downstream and upstream paths of the network. Test equipment may be located at a headend of the network and configured to transmit a signal downstream to a remotely located loopback device that redirects the signal in the upstream path to the test equipment. The upstream characteristics may be predominant in the analysis of the return signal because the downstream path may be relatively free from noise.

6 Claims, 4 Drawing Sheets

SYSTEM AND METHOD TO TEST NETWORK PERFORMANCE WITH IMPAIRMENTS

BACKGROUND OF THE INVENTION a. Field of the Invention

The present invention pertains to testing of networks specifically to testing networks that have different upstream and downstream paths.

b. Description of the Background

Networks that are deployed in the field have performance characteristics that are difficult to accurately measure or simulate in a lab environment. Various components that make up the transmission network and the devices that are connected thereto cannot be easily subjected to 'real world' environments in a test laboratory.

For example, in order to test the upstream performance of a cable modem or other home terminal device connected to a cable television distribution network, it would be desirable to connect the cable modem at a subscriber's home. To generate performance characteristics, a signal is transmitted through the network and measured to determine any lost or corrupted data packets, audible impairments in phone conversations, high bit error rates, high latency, low throughput, or other characteristics. Some of the test equipment requires that both ends of the connection be located in the same physical location for testing. Such connections may be cumbersome to accomplish using existing equipment when performed in the field, as a separate signal path may need to be established at a subscriber's home for the sake of the test equipment.

Other testing methodologies rely on testing devices in a laboratory environment with artificially generated noise profiles. While such noise profiles may assist a designer in preliminary characterization of a device, some phenomena may not be able to be characterized in a laboratory environment.

In another use for testing methods, the network performance may be characterized. Such information may be useful in identifying areas for maintenance or for planning upgrades to the network.

Some transmission networks, such as cable television distribution networks, have a significant difference in the upstream and downstream performance characteristics. In general, the downstream performance is relatively noise free, while the upstream performance is significantly noisier. The downstream performance is generally well characterized and maintained, as subscribers are quick to report any problems with their television reception. The upstream performance is much less noticeable and the upstream direction may have much different and larger impairments than the downstream signal path.

Cable upstream plant impairments can be classified into two general categories. Additive impairments are noise signals that are linearly summed with the desired signal. Some additive impairments are random noise, burst noise, common path distortion, ingressing broadcast carriers, and switching regulator noise. Multiplicative impairments are distortions that occur to the signal being transmitted. Some multiplicative impairments are group delay distortion, multipath distortion, laser clipping, and hum modulation. A key difference is that additive impairments can be observed at the hub without a signal transmission occurring, but the multiplicative impairments cannot be observed without a signal transmission occurring.

It would therefore be advantageous to provide a system and method for testing networks and components attached to networks wherein the testing can use actual distribution paths in the field. It would be further advantageous to provide a system wherein the test equipment may be located in a convenient location and for the system and method to be capable of gathering data about actual network performance.

SUMMARY OF THE INVENTION

The present invention overcomes the disadvantages and limitations of the prior art by providing a system and method for performing various tests for symmetric or non-symmetric communication networks wherein test equipment may be located in a network distribution facility or other convenient location and use one or more remotely located loop back devices. A signal may be sent from the distribution location to a remote location through a downstream channel where the signal is transformed and returned via an upstream channel. The signal is then compared to the origination signal and analyzed. The system may be used to characterize various components attached to the distribution network or for characterizing the overall performance of the distribution network.

The present invention may therefore comprise a method for testing a non-symmetrical network comprising: providing the network having a first direction of transmission and a second direction of transmission wherein the second direction of transmission has larger impairments than the first direction of transmission and having a distribution point with a downstream connection and an upstream connection; connecting a loopback device to the network at a remote location, the loopback device adapted to receive a signal from the first direction of transmission, transform the signal, and transmit the signal in the second direction of transmission; connecting a test apparatus to the network at a distribution point of the network such that the test apparatus input is connected to the upstream connection of the distribution point and the test apparatus output is directed along the downstream path of the network; creating a signal in the test apparatus transmitting the signal from the test apparatus to the loopback device; transforming the signal with the loopback device; transmitting the signal from the loopback device to the distribution point; transmitting the signal from the distribution point to the test apparatus; receiving the signal; and performing at least one measurement of the signal.

The present invention may further comprise a method for testing a cable television distribution network comprising: providing the cable television distribution network having a downstream direction of transmission and an upstream direction of transmission wherein the upstream direction of transmission has larger impairments than the downstream direction of transmission and having a distribution point with a downstream connection and an upstream connection; connecting a loopback device to the network at a remote location, the loopback device adapted to receive a signal from the first direction of transmission, transform the signal, and transmit the signal in the second direction of transmission; connecting a test apparatus to the network at a distribution point of the network such that the test apparatus input is connected to the upstream connection of the distribution point and the test apparatus output is directed along the downstream path of the network; creating a signal in the test apparatus; transmitting the signal from the test apparatus to the loopback device; transforming the signal with the loopback device; transmitting the signal from the loopback device to the distribution point; transmitting the signal from the distribution point to the test apparatus; and performing at least one measurement of the signal.

The present invention may further comprise a cable television distribution network with a testing capability comprising: a loopback device connected to the network at a remote location, the loopback device adapted to receive a signal from the downstream direction of the network, transform the signal, and transmit the signal in the upstream direction of the network; a test apparatus connected to the network at a distribution point of the network such that the test apparatus input is connected to the upstream connection of the distribution point and the test apparatus output is directed along the downstream path of the network, the test apparatus adapted to create a signal in the test apparatus, transmit the signal from the test apparatus to the loopback device wherein the signal is transformed by the loopback device and transmitted from the loopback device to the distribution point wherefrom the signal is transmitted to the test apparatus and measured.

The present invention may further comprise a cable television distribution network with a testing capability comprising: a loopback means connected to the network at a remote location, the loopback means adapted to receive a signal from the downstream direction of the network, transform the signal, and transmit the signal in the upstream direction of the network; and a testing means connected to the network at a distribution point of the network such that the input of the testing means is connected to the upstream connection of the distribution point and the output of the testing means is directed along the downstream path of the network, wherein the testing means comprises a cable modem.

The advantages of the present invention are that various components of a distribution network may be tested in a real world environment. Further, tests that are specifically directed toward upstream transmissions may be performed because the upstream impairments are typically much larger than the impairments on the downstream side. The present invention may be used to characterize and analyze the distribution network for performance testing, detection of problems on the network, or other uses.

DETAILED DESCRIPTION OF THE DRAWINGS

Figure 1:
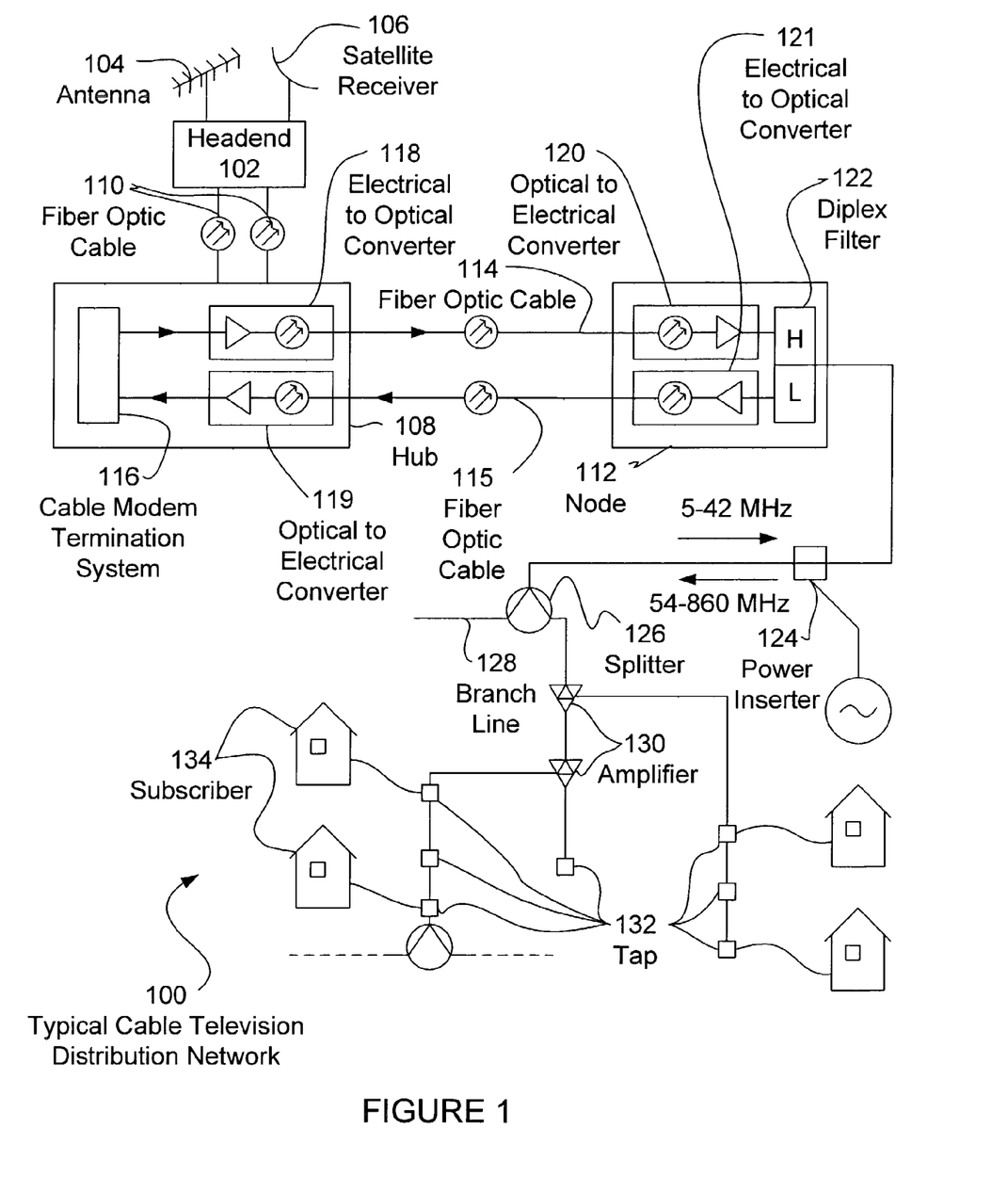
FIG. 1 is an illustration of a typical cable television distribution network.

FIG. 1 illustrates a typical cable television distribution network 100. The head end 102 is the source for the various television signals. Various antennas 104 and satellite antenna or dish 106 may receive television signals and be converted as necessary and transmitted over fiber optic cables 110 to a hub 108. Several hubs may be connected to a single head end 102.

The hub 108 may be connected to several nodes 112 by fiber optic cable 114. In general, the fiber optic cable 114 may have several cables dedicated to downstream transmission and several cables dedicated to upstream transmission. There may be more or less cables transmitting downstream than upstream.

Various power boosters or other devices may be incorporated into the transmission system. These devices may be incorporated at specific intervals along the fiber optic cable to increase the resulting power at the termination of the transmission line. Such devices may be incorporated between a head end 102 and a hub 108, between a hub 108 and a node 112, or other places along the distribution network as known in the art.

The communication path for a cable modem in the cable television network contains the cable modem termination system 116 (CMTS) that connects the local cable network to the internet backbone. The CMTS may exist in a head end 102, a hub 108, or a node 112 depending on the design of the network.

The CMTS connects to a downstream path through an electrical to optical converter 118 connected to the fiber optic cable 114 to an optical to electrical converter 120. The signal is transmitted to a diplex filter 122 that combines the upstream and downstream signals onto a single cable. In a modem cable distribution system, the downstream signals may be 54 to 860 MHz and the upstream signals may be between 5 and 42 MHz.

After the signal leaves the node 112, the signal is typically carried by coaxial cable. At various stages, a power inserter 124 may be used to power the coaxial line equipment, such as amplifiers or other equipment. The signal may be split with a splitter 126 to a branch line 128. Further, at various locations, amplifiers 130 may boost the signal. Trunk amplifiers 130 may also split the signal. Taps 132 along the branches may be connected to subscriber's homes 134. The illustrated configuration is typical of some of the various components of a cable television distribution network. Many of the components have different upstream and downstream performance characteristics as would be appreciated by those skilled in the art.

Upstream transmissions occur from subscribers to the hub or head end by passing through the same coaxial cable as the downstream signals, but in the opposite direction. This is accomplished by the upstream signals a different frequency band. Diplex filter 122 allows bi-directional use of a single coaxial cable. Electrical to optical converter 121 converts the upstream electrical signals to light waves where they are sent through fiber optic cable 115 and received by optical to electrical converter 119.

The network 100 may have different downstream and upstream characteristics. The signals that originate at the head end 102 are divided and split at various locations while generally keeping the signal intact. As such, there is one source for signals and many receivers. For upstream communication such as with a cable modem or other remote transmitters, there are many sources for signals that are combined for a single receiver. The 'funnel effect' of the plurality of noise generating locations makes for drastically increased noise on the upstream side as compared to the downstream side. Further, older networks have been designed primarily for downstream performance. As such, the older networks may have poor upstream performance.

Various networks may have significantly different performance characteristics. Many factors contribute to the performance effects, including cable length and quality and the multitude of connectors and components distributed along the path. Further, environmental factors, such as burst noise, changes on the power grid, lightning, ingressing external RF noise, and other factors may degrade the performance of the network. The components attached to the network, such as a cable modem, may be designed to operate correctly while tolerating the effects of these impairments.

Figure 2:
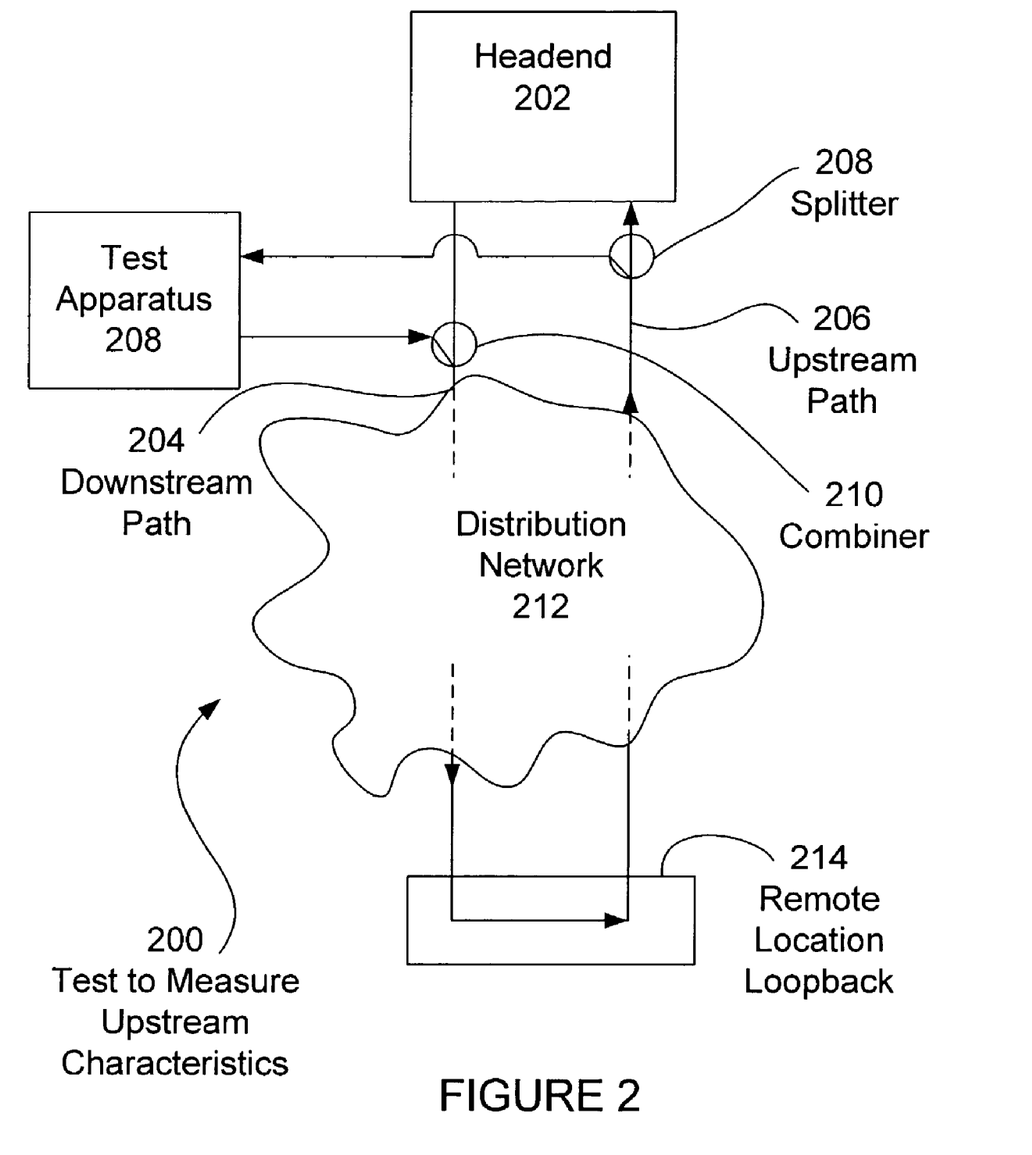
FIG. 2 is an illustration of an embodiment of the present invention of a test to measure upstream characteristics.

FIG. 2 illustrates an embodiment 200 of a test to measure upstream characteristics. The head end 202 is the general source and sink for signals distributed and received throughout the network and is connected to a downstream path 204 and an upstream path 206. The test apparatus 208 is connected to the upstream path 204 through a splitter 208 and to the downstream path through a combiner 210. The test apparatus connection allows the test apparatus 208 to receive an upstream signal from the distribution network 212 and transmit a signal downstream into the distribution network 212. The signals travel through the distribution network 212 to a remote location loopback 214. The signal returns on the upstream path, through a splitter 208, and back to the test apparatus 208.

The embodiment 200 may send signals through both the downstream and upstream paths of the network. However, because of the nature of the network wherein the upstream path has much more noise than the downstream, the upstream characteristics may be primarily measured and monitored. The downstream noise and other characteristics may be present in the measurements, but the magnitude of the downstream contributions may be considered insignificant.

The embodiment 200 allows a test to be performed in a 'real world' environment without having to locate the test apparatus in the field. In some cases, the remote location loopback 214 may be many miles away, making the prior art testing methods inconvenient. Further, the cost and mobility of some test equipment may be prohibitive to locate in remote locations.

In the example of a cable television distribution network, the head end 202 may be a cable television operator's head end, or some other convenient distribution point along the network. For example, the head end 202 may represent a hub or node of a cable television network, depending on the specific test required. Those skilled in the art will recognize that the test apparatus 208 may be placed in several locations in a network while maintaining within the spirit and intent of the present invention.

The test apparatus 208 may be specific test equipment designed to measure and characterize the performance of the network 212. In other cases, the test apparatus 208 may comprise a component attached to the network. In such cases, the performance of the component may be measured with 'real world' noise and transient effects. Such noise and effects may be difficult or impossible to reproduce in a laboratory environment because the impairments do not behave in a deterministic fashion.

Figure 3:
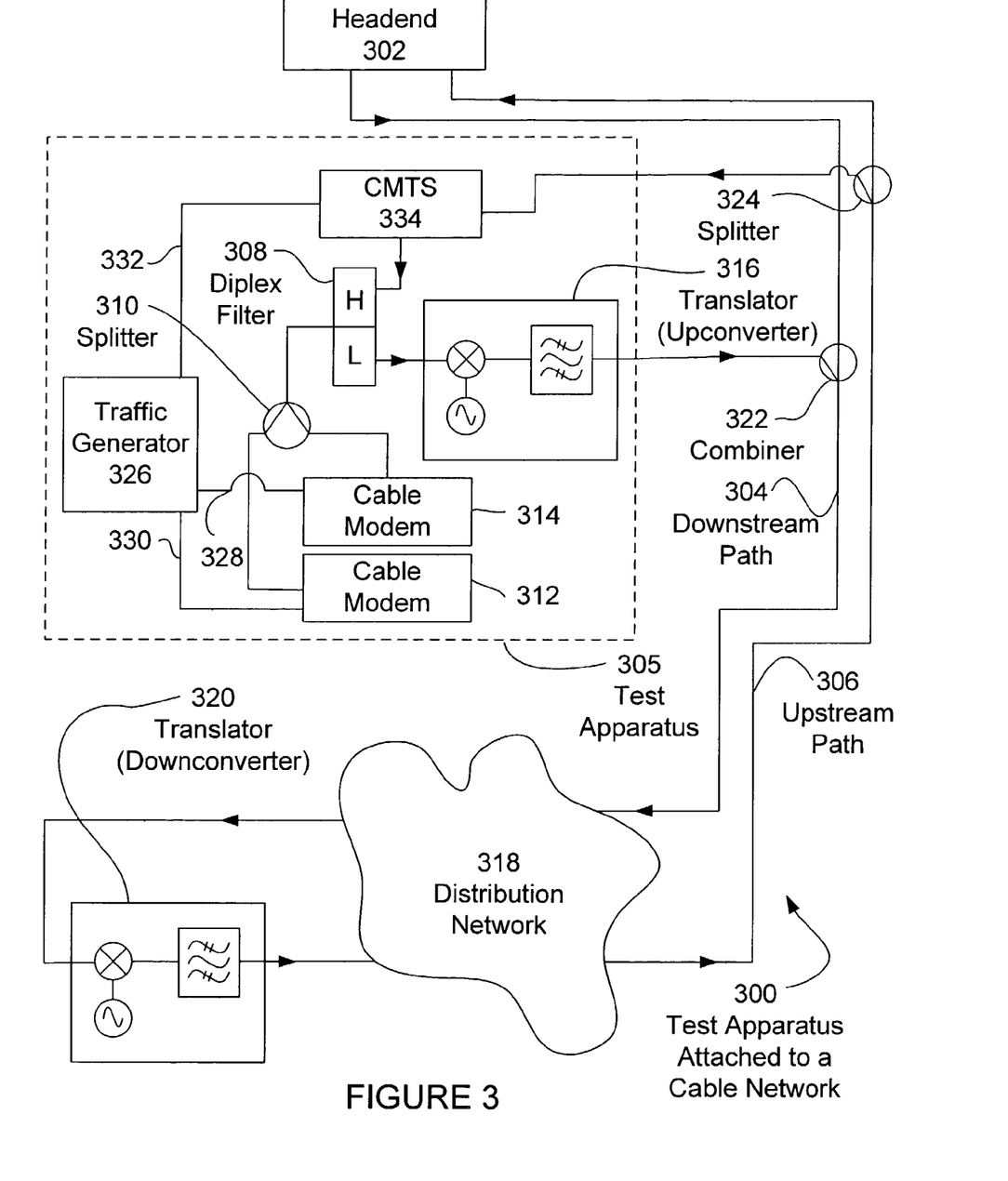
FIG. 3 is an illustration of an embodiment of the present invention of a test to measure the upstream performance of two cable modems and a cable modem termination system (CMTS).

FIG. 3 illustrates an embodiment of a test apparatus connected to a cable network 300 to measure the upstream performance of two cable modems. The head end 302 has a downstream path 304 and an upstream path 306. The test apparatus 305 receives input from a splitter 324 connected to the upstream path 306. Test apparatus comprises a cable modem termination system (CMTS) 334, a diplex filter 308 connected to a splitter 310 and cable modems 312 and 314. The upstream signals from the cable modems 312 and 314 return through the low port of the diplex filter 308 and a translator or upconverter 316 and combiner 322 to the downstream path 304 and the distribution network 318. The signals travel through the downstream portion of the network 318, and through a translator or downconverter 320. Signals then travel through the upstream path of the network 318, through the splitter 324, and return to the test apparatus 305. The upstream traffic enters the CMTS 334 where it is received and processed.

The signals leaving the test apparatus 305 on the downstream path 304 may be for example 450 MHz. The output of the cable modem 312 may be for example 35 MHz. The translator 316 may translate the 35 MHz signal to 450 MHz or another vacant channel for transmission through the downstream side of the network 318. The translator 320 may convert the 450 MHz signal to 35 MHz for transmission through the upstream side of the network 318. Those skilled in the art will appreciate that the various frequencies are for example only and other frequencies and devices may be used while keeping within the spirit and intent of the present invention. In the case of CMTS testing, the upconverter and downconverter frequency offsets should be approximately equal for proper operation of the CMTS, since the CMTS directs the cable modems to use an upstream frequency and expects the upstream signals to be at that frequency.

A traffic generator 326 is one example of many possible methods to measure the performance and relative performance differences between cable modems 312 and 314. Traffic generator 326 is connected to cable modem 312 via Ethernet cable 330, and to cable modem B through Ethernet cable 328. Ethernet cable 332 connects the CMTS 334 to the traffic generator. The traffic generator 326 may generate signals that are transmitted by the cable modems 312 and 314 through the network 318.

Cable modems may have more difficulty in transmitting in the upstream direction than receiving in the downstream direction. This may be due to some of the upstream impairments of the distribution network in addition to the various upstream communication protocols. The embodiment 300 loops the signals from the cable modems 312 and 314 through both the downstream and upstream signal paths of the network 318. However, due to the greatly increased impairments of the upstream signal path, the effects that may be seen in a test using the present embodiment may be largely due to the upstream effects. The downstream effects present in the return signal may be very miniscule and therefore ignored. In the modern cable television distribution network, for example, the development of devices such as cable modems has primarily focused on increasing the upstream performance of the devices, since the downstream performance is generally established.

The embodiment 300 allows two cable modems 312 and 314 to be operated in an actual network as if the modems were located remotely. The remotely located downconverter 320 may be placed in a subscriber's home or may be located at some other remote location on the network 318, such as a status monitoring module, optical node, or line amplifier. The distance between the test apparatus 305 and the downconverter 320 may be many miles.

Devices other than cable modems may be tested using the present embodiment. Such devices include gaming devices using cable modem technology, various telephony devices including voice and video telephony, various internet appliances or other communication devices, or other equipment as may be desired.

The performance of the cable modems 312 and 314 may be compared against each other. In some cases, specialized test software may control the cable modems 312 and 314 to generate specific test patterns that may be designed to stress various aspects of the network, such a throughput, jitter, latency, or frame loss ratio. Further, the tests of the cable modems 312 and 314 may be for extended lengths of time, such as for many days or even weeks, so that the performance characteristics of the modems may be analyzed, evaluated, or averaged over a long period of time.

The parameters monitored during a test of a cable modem may comprise voice and picture quality, frame loss ratio, packet size, tests of various modulation types, constellations size, symbol rate, forward error correction tests, throughput, latency and jitter, UDP, TCP, or FTP repeat loss packets, and other tests as may be desired. Those skilled in the art may incorporate many different tests while maintaining within the spirit and intent of the present invention.

Other two-way services not utilizing cable modems can also be measured by this technique. For example, switched cable telephony, IP (internet protocol) telephony, status monitoring systems, video conferencing and security systems can all be measured using the inventive technique.

The downconverter 320 may be a specialized piece of hardware that is attached to a subscriber's cable television drop. Such an installation may be used to detect problems in a specific subscriber's home. In other embodiments, the downconverter 320 may be permanently located on a tap at a remote location of the network. Such an embodiment may be used for repeated tests of cable modems or other equipment or for overall system characterization as required.

In some embodiments, a cable modem located in a subscriber's home may incorporate a downconverter 320. Such a downconverter may be remotely activated to turn on and off the loopback feature. Such a loopback feature may be used for periodic monitoring of the network.

In still other embodiments, a cable modem in a subscriber's home may be programmed to perform the loopback function using digital rather than an analog loopback circuit. A digital loopback system may involve digitally sampling the incoming waveform, performing a re-generation, and sending the resultant waveform.

The embodiment 300 may be used to characterize the performance of the network using several methods known in the art. For example, the test system known as SmartBits™ from Spirent Communications, Xixia, or CW Tester from Cable Laboratories may be used as part of the test apparatus 305. Such systems may send specific test signals through the network 318 and compare the transmitted signals with the received signals to determine various characteristics and performance measures of the network. Such tests may be used to monitor the performance of the network and assist in identifying problems. In other cases, benchmark performance measurements may be used to characterize a network in preparation for network upgrades or in the valuation of the network for sale.

Figure 4:
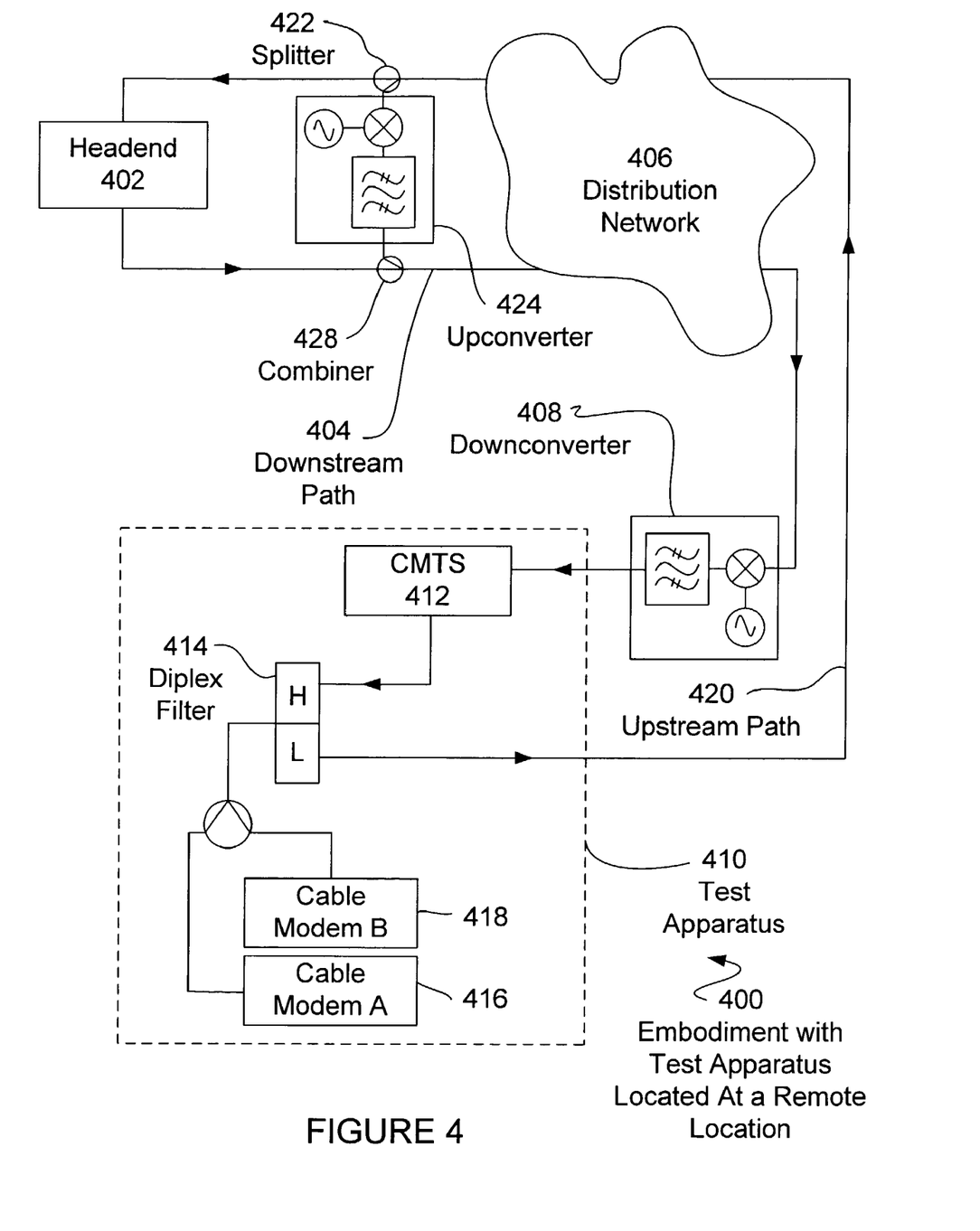
FIG. 4 is an illustration of an embodiment of the present invention wherein the test apparatus is located at a remote location.

FIG. 4 illustrates an embodiment 400 of the present invention wherein the test apparatus is located at a remote location. The head end 402 is connected to a downstream path 404 that flows through the distribution network 406 and a downconverter 408 to the test apparatus 410. Signals flow to the CMTS 412, a diplex filter 414 and to the cable modems 416 and 418. The return path is through the diplex filter 414 and the upstream path 420, the distribution network 406, splitter 422, upconverter 424, combiner 426, and back through the network 406.

Upstream traffic signals generated by cable modems 416 and 418 pass through the low port of diplex filter 414, the upstream path 420, through the distribution network 406 to the splitter 422. The upstream signal exits splitter 422 and enters the upconverter 424 where it is converted to a downstream frequency band. The signal enters combiner 428 where it again passes through the distribution network 406. The signal enters the downconverter and is returned to the return band frequency and received by the CMTS 414.

The present embodiment illustrates how test apparatus 410 may be located at any point along the network as is convenient for testing. A remote location may be in a subscriber's home or other remote location. In some cases, the test apparatus may be temporarily attached for testing purposes or may be permanently attached for continuous or periodic monitoring of the network performance. In the present embodiment, the loopback device may comprise the splitter 422, the upconverter 424, and combiner 426 that serve to redirect the signal from the test apparatus 410 back through the network 406 to the test apparatus 410.

Other equipment may be included in the test apparatus 410. Such equipment may be data traffic generation equipment, data logging equipment, monitoring equipment, or other equipment known in the art. Those skilled in the art may perform any test or data gathering operation using various equipment while keeping within the scope and intent of the present invention.

DOCSIS® compatible CMTSs have a limit on round trip delay time as specified by the DOCSIS specifications. In a typical field deployment, it can be generally assumed that the time spent for a signal to travel downstream is equal to the time spent for a signal to travel upstream. In test apparatus 305 the time downstream traffic spends traveling from the CMTS to the cable modems is negligible, since there is a direct connection inside the head end. However, the upstream traffic must pass through the network twice, taking twice as long. Hence, the test apparatus 305 will accurately replicate the round trip delay experienced in a typical field deployment.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method for testing a non-symmetrical network comprising:

providing said non-symmetrical network having a distribution point, a first direction of transmission operating at a first frequency, and a second direction of transmission operating at a second frequency, said first direction of transmission corresponding to a downstream direction of transmission operating at said first frequency that is a higher frequency than said second frequency, said second direction of transmission corresponding to an upstream direction of transmission operating at said second frequency that is a lower frequency than said first frequency, and said upstream direction of transmission having larger impairments than said downstream direction of transmission;

connecting a test apparatus having a cable modem termination system (CTMS), an input to said non-symmetrical network, an output to said non-symmetrical network, at least one cable modem, a diplex filter, and an upconverter having an input and an output at said distribution point of said non-symmetrical network such that said test apparatus output is connected to said first direction of transmission that corresponds to said downstream direction of transmission through a combiner device, said test apparatus input is connected to said second direction of transmission that corresponds to said upstream direction of transmission through a splitter device, said cable modem connects to said CTMS and said upconverter input through said diplex filter, said CTMS connects at said input of said test apparatus to said upstream direction of transmission, and said upconverter output connects at said output of said test apparatus to said downstream direction of transmission;

connecting a loopback device having an input and an output to said non-symmetrical network at a remote location from said distribution point such that said loopback device input is connected to said first direction of transmission operating at said first frequency and said loopback device output is connected to said second direction of transmission operating at said second frequency;

creating a test signal in said test apparatus;

transmitting said test signal from said test apparatus to said loopback device through said test apparatus output on said first direction of transmission operating at said first frequency;

receiving said test signal on said first direction of transmission at said loopback device input at said first frequency;

transforming said test signal from said first frequency operating at said higher frequency of said downstream direction of transmission to said second frequency operating at said lower frequency of said upstream direction of transmission in said loopback device operating as a downconverter device;

transmitting said test signal from said loopback device output to said distribution point on said second direction of transmission operating at said second frequency;

receiving said test signal on said second direction of transmission at said test apparatus input connected to said second direction of transmission and operating at said second frequency; and performing at least one analysis measurement test on said test signal.

2. A method for testing a non-symmetrical network comprising:

providing said non-symmetrical network having a distribution point, a first direction of transmission operating at a first frequency, and a second direction of transmission operating at a second frequency, said first direction of transmission corresponding to an upstream direction of transmission operating at said first frequency that is a lower frequency than said second frequency, said second direction of transmission corresponding to a downstream direction of transmission operating at said second frequency that is a higher frequency than said first frequency, and said upstream direction of transmission has larger impairments than said downstream direction of transmission;

connecting a test apparatus having a cable modem termination system (CTMS), an input to said non-symmetrical network, an output to said non-symmetrical network, at least one cable modem, and a diplex filter at said distribution point of said non-symmetrical network such that said test apparatus output is connected to said first direction of transmission that corresponds to said upstream direction of transmission, said test apparatus input is connected to said second direction of transmission that corresponds to said downstream direction of transmission through a downconverter device, said cable modem is connected to said CTMS and said test apparatus output through said diplex filter;

connecting a loopback device having an input and an output to said non-symmetrical network at a remote location from said distribution point such that said loopback device input is connected to said first direction of transmission corresponding to said upstream direction of transmission operating at said first frequency through a splitter device and said loopback device output is connected to said second direction of transmission corresponding to said downstream direction of transmission operating at said second frequency through a combiner device;

creating a test signal in said test apparatus;

transmitting said test signal from said test apparatus to said loopback device through said test apparatus output on said first direction of transmission operating at said first frequency;

receiving said test signal on said first direction of transmission at said loopback device input at said first frequency;

transforming said test signal from said first frequency operating at said lower frequency of said upstream direction of transmission to said second frequency operating at said higher frequency of said downstream direction of transmission in said loopback device operating as an upconverter device;

transmitting said test signal from said loopback device output to said distribution point on said second direction of transmission operating at said second frequency;

receiving said test signal on said second direction of transmission at said test apparatus input connected to said second direction of transmission and operating at said second frequency; and performing at least one analysis measurement test on said test signal.

3. A non-symmetrical network test system comprising:

a non-symmetrical network that has a distribution point, a first direction of transmission operating at a first frequency, and a second direction of transmission operating at a second frequency, said first direction of transmission corresponding to a downstream direction of transmission operating at said first frequency that is a higher frequency than said second frequency, said second direction of transmission corresponding to an upstream direction of transmission operating at said second frequency that is a lower frequency than said first frequency, and said upstream direction of transmission having larger impairments than said downstream direction of transmission, and further comprising;

a test apparatus located at said distribution point of said non-symmetrical network that has a cable modem termination system (CTMS), an input to said non-symmetrical network, an output to said non-symmetrical network, at least one cable modem, a diplex filter, and an upconverter that has an input and an output, such that said test apparatus output is connected to said first direction of transmission that corresponds to said downstream direction of transmission, said test apparatus input is connected to said second direction of transmission that corresponds to said upstream direction of transmission, said cable modem is connected to said CTMS and said upconverter input through said diplex filter, said CTMS is connected at said input of said test apparatus to said upstream direction of transmission, and said upconverter output is connected at said output of said test apparatus to said downstream direction of transmission;

a loopback device located at a remote location from said distribution point that has an input and an output to said non-symmetrical network, such that said loopback device input is connected to said first direction of transmission operating at said first frequency and said loopback device output is connected to said second direction of transmission operating at said second frequency;

a test signal creation subsystem that is part of said test apparatus that creates a test signal and transmits said test signal from said test apparatus to said loopback device through said test apparatus output on said first direction of transmission operating at said first frequency;

a signal transformation subsystem that is part of said loopback device that receives said test signal on said first direction of transmission at said loopback device input at said first frequency, transforms said test signal from said first frequency to said second frequency, and transmits said test signal from said loopback device output to said distribution point on said second direction of transmission operating at said second frequency;

a test signal reception subsystem that is part of said test apparatus that receives said test signal on said second direction of transmission at said test apparatus input connected to said second direction of transmission and operating at said second frequency; and a test signal analysis system that performs at least one analysis measurement test on said test signal.

4. The non-symmetrical network test system of claim 3 further comprising:

a combiner device that connects said test apparatus output to said downstream direction of transmission;

a splitter device that connects said test apparatus input to said upstream direction of transmission; and a downconverter subsystem that is part of said signal transformation subsystem of said loopback device that transforms said test signal from said higher frequency of said downstream direction of transmission to said lower frequency of said upstream direction of transmission.

5. A non-symmetrical network test system comprising:

a non-symmetrical network that has a distribution point, a first direction of transmission operating at a first frequency, and a second direction of transmission operating at a second frequency;

a test apparatus located at said distribution point of said non-symmetrical network that has a cable modem termination system (CTMS), an input to said non-symmetrical network, an output to said non-symmetrical network, at least one cable modem, and a diplex filter, such that said test apparatus output is connected to said first direction of transmission, said test apparatus input is connected to said second direction of transmission, and said cable modem is connected to said CTMS and said test apparatus output through said diplex filter;

a loopback device located at a remote location from said distribution point that has an input and an output to said non-symmetrical network, such that said loopback device input is connected to said first direction of transmission operating at said first frequency and said loopback device output is connected to said second direction of transmission operating at said second frequency;

a test signal creation subsystem that is part of said test apparatus that creates a test signal and transmits said test signal from said test apparatus to said loopback device through said test apparatus output on said first direction of transmission operating at said first frequency;

a signal transformation subsystem that is part of said loopback device that receives said test signal on said first direction of transmission at said loopback device input at said first frequency, transforms said test signal from said first frequency to said second frequency, and transmits said test signal from said loopback device output to said distribution point on said second direction of transmission operating at said second frequency;

a test signal reception subsystem that is part of said test apparatus that receives said test signal on said second direction of transmission at said test apparatus input connected to said second direction of transmission and operating at said second frequency; and a test signal analysis system that performs at least one analysis measurement test on said test signal.

6. The non-symmetrical network test system of claim 5 wherein said first direction of transmission corresponds to an upstream direction of transmission operating at said first frequency that is a lower frequency than said second frequency, said second direction of transmission corresponds to a downstream direction of transmission operating at said second frequency that is a higher frequency than said first frequency, and said upstream direction of transmission has larger impairments than said downstream direction of transmission, and further comprising:

a downconverter device that connects said test apparatus input to said downstream direction of transmission;

a splitter device that connects said loopback device input to said upstream direction of transmission;

a combiner device that connects said loopback device output to said downstream direction of transmission; and an upconverter subsystem that is part of said signal transformation subsystem of said loopback device that transforms said test signal from said lower frequency of said upstream direction of transmission to said higher frequency of said downstream direction of transmission.

* * * * *